United States Patent
Lee

(10) Patent No.: US 10,923,078 B2
(45) Date of Patent: Feb. 16, 2021

(54) PHOTO SENSOR, DISPLAY DEVICE INCLUDING THE SAME, AND DRIVING METHOD THEREOF

(71) Applicant: Samsung Display Co., Ltd., Yongin-si (KR)

(72) Inventor: Hyun Woo Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/543,297

(22) Filed: Aug. 16, 2019

(65) Prior Publication Data

US 2020/0219462 A1 Jul. 9, 2020

(30) Foreign Application Priority Data

Jan. 9, 2019 (KR) .................. 10-2019-0002921

(51) Int. Cl.
| G09G 5/10 | (2006.01) |
| G06T 7/70 | (2017.01) |
| G06F 3/01 | (2006.01) |
| H04N 5/247 | (2006.01) |

(52) U.S. Cl.
CPC .............. *G09G 5/10* (2013.01); *G06F 3/013* (2013.01); *G06T 7/70* (2017.01); *H04N 5/247* (2013.01); *G06T 2207/30201* (2013.01); *G09G 2320/0693* (2013.01); *G09G 2354/00* (2013.01); *G09G 2360/144* (2013.01)

(58) Field of Classification Search
CPC ............. G09G 5/10; G09G 2320/0693; G09G 2360/144; G06T 7/70; G06T 7/80–85; G06T 2207/30201; G06F 3/013
See application file for complete search history.

(56) References Cited

U.S. PATENT DOCUMENTS

| 5,854,661 | A | * | 12/1998 | Kochanski | ............... G09G 5/00 348/602 |
| 9,557,813 | B2 | * | 1/2017 | Yairi | ...................... G06F 3/016 |
| 10,006,982 | B2 | * | 6/2018 | Jeong | .................... G01S 3/7861 |
| 2003/0128355 | A1 | | 7/2003 | Perkins et al. | |
| 2012/0229487 | A1 | | 9/2012 | Samanta et al. | |
| 2014/0085265 | A1 | | 3/2014 | Yin | |
| 2015/0177906 | A1 | * | 6/2015 | Yairi | ...................... G06F 3/016 345/648 |
| 2015/0187258 | A1 | * | 7/2015 | Lee | .................... G06K 9/00604 345/207 |

(Continued)

FOREIGN PATENT DOCUMENTS

KR 10-1907143 B1 10/2018

OTHER PUBLICATIONS

Samsung Display Newsroom, "The AMOLED of the Galaxy S6 is rated the best with its outstanding picture quality!", Mar. 11, 2015; URL : http://news.samsungdisplay.com/2635; 8pp.

(Continued)

*Primary Examiner* — Michael Pervan

(74) *Attorney, Agent, or Firm* — Lewis Roca Rothgerber Christie LLP

(57) ABSTRACT

A photo sensor includes: a first substrate including a concave surface; a plurality of photo sensor units on the concave surface; and a cover covering the concave surface, the cover being spaced apart from the photo sensor units, and including a transmissive region and a non-transmissive region.

19 Claims, 17 Drawing Sheets

(56) References Cited

U.S. PATENT DOCUMENTS

2016/0198091 A1\* 7/2016 Edwards ............ H04N 5/23241
 348/78
2017/0047046 A1\* 2/2017 Tam ................... H04N 21/4854
2017/0148376 A1 5/2017 Yoo et al.

OTHER PUBLICATIONS

EPO Partial Search Report dated Mar. 19, 2020, for corresponding European Patent Application No. 20151011.2 (14 pages).

\* cited by examiner

FIG. 4
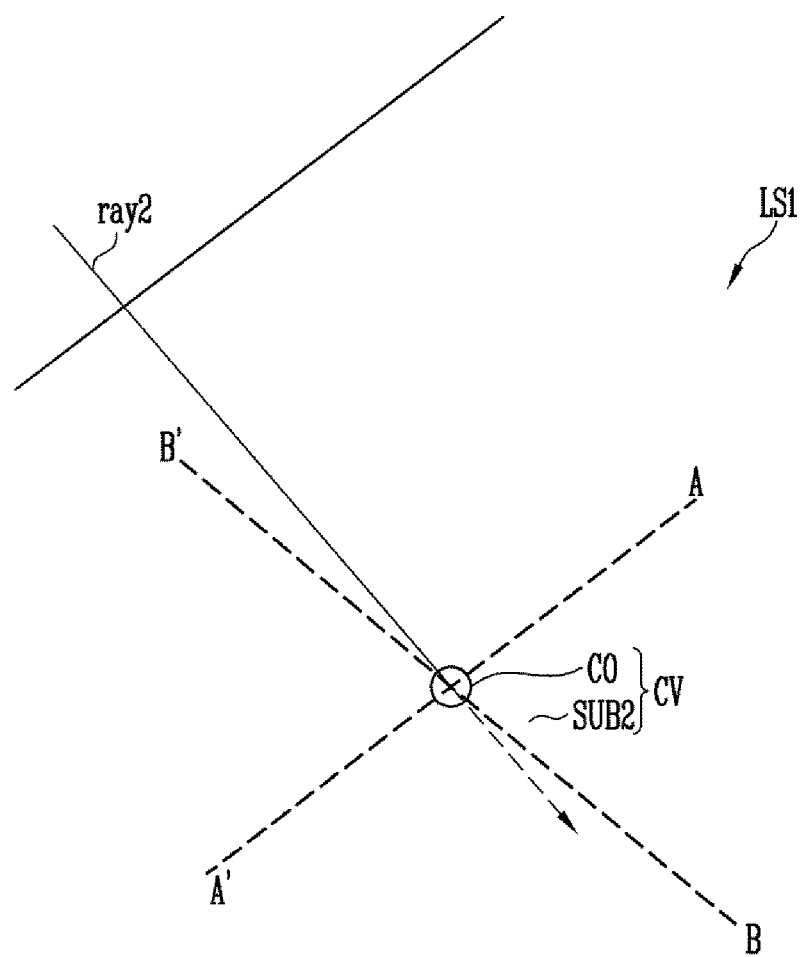
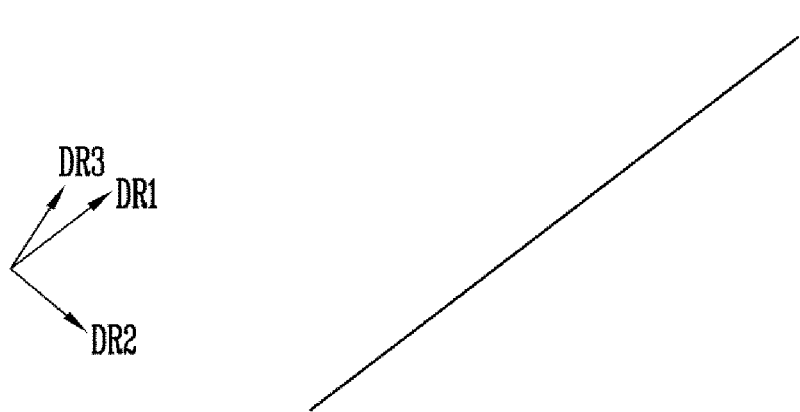

PHOTO SENSOR, DISPLAY DEVICE INCLUDING THE SAME, AND DRIVING METHOD THEREOF

CROSS-REFERENCE TO RELATED APPLICATION

This application claims priority to and the benefit of Korean Patent Application No. 10-2019-0002921 filed in the Korean Intellectual Property Office on Jan. 9, 2019, the entire contents of which are incorporated herein by reference.

BACKGROUND

1. Field

Aspects of some example embodiments of the present invention relate to a driving method of a photo sensor, a display device and a display device including the same.

2. Description of the Related Art

As information technology has developed, the importance of display devices, which provide a connection medium between users and information, has increased. In response to this, the use of display devices such as liquid crystal displays, organic light emitting diode displays, plasma display devices, and the like has increased.

Display devices can display images by emitting light using a combination of pixels at an image display surface of the display device. However, when external light emitted from an external light source such as the sun, indoor light, and the like is reflected by the image display surface, the external light may be reflected which may degrade the quality of the perceived image emitted by the display device.

In related art display devices may attempt to reduce reflection of external light by using a passive means such as coating an anti-reflection film on the image display surface of the display device.

The above information disclosed in this Background section is only for enhancement of understanding of the background of the invention and therefore it may contain information that does not constitute prior art.

SUMMARY

Some example embodiments of the present invention may include a photo sensor capable of actively responding to reflection of external light by locally raising a luminance level at a portion of an image display surface where external light is being reflected, a display device including the same, and a driving method thereof.

A photo sensor according to some example embodiments of the present invention includes a first substrate including a concave surface; a plurality of photo sensor units arranged on the concave surface; and a cover covering the concave surface, the cover being spaced apart from the photo sensor units, and including a transmissive region and a non-transmissive region.

According to some example embodiments, the concave surface may have a hemisphere shape.

According to some example embodiments, the transmissive region may correspond to a center of the hemisphere shape.

According to some example embodiments, the cover may include a second substrate, and the transmissive region may correspond to an opening of the second substrate.

According to some example embodiments, distances from the transmission region to the photo sensor units may be the same.

A display device according to some example embodiments of the present invention includes an image display surface; a first camera; a first photo sensor; and a processor configured to determine an incident angle of external light with respect to a first region of the image display surface using the first photo sensor, determine a reflection angle of an user's eyeball with respect to the first region using the first camera, and raise a luminance level at the first region when the incident angle and the reflection angle correspond to each other.

According to some example embodiments, the processor may be configured to determine an incident angle of the external light with respect to the first photo sensor to the incident angle of the external light with respect to the first region.

According to some example embodiments, the processor may be configured to determine the reflection angle of an eye of the user relative to the first region by correcting the reflection angle of the eye of the user relative to the first camera using relative distances of the first region with respect to the first camera.

According to some example embodiments, the display device may further include the second camera spaced apart from the first camera, wherein the processor is configured to determine the reflection angle of relative to the eye of the user for the first region by using the first camera and the second camera.

According to some example embodiments, the display device may further include a second photo sensor spaced apart from the first photo sensor, wherein the processor is configured to determine a three-dimensional position of an external light source for the display device by using the first photo sensor and the second photo sensor, and the processor is configured to determine the incident angle of the external light with respect to the first region by using the three-dimensional position of the external light source.

According to some example embodiments, the first photo sensor may include a first substrate including a concave surface; a plurality of photo sensor units arranged on the concave surface; and a cover covering the concave surface, the cover being spaced apart from the photo sensor units, and including a transmissive region and a non-transmissive region.

According to some example embodiments, the first photo sensor or the second photo sensor may include a first substrate including a concave surface; a plurality of photo sensor units arranged on the concave surface; and a cover covering the concave surface, the cover being spaced apart from the photo sensor units, and including a transmissive region and a non-transmissive region.

A driving method of a display device according to some example embodiments of the present invention includes: determining an incident angle of external light with respect to a first region of an image display surface using a first photo sensor; determining a reflection angle of an eye of a user relative to the first region using a first camera; and raising a luminance level of the first region when the incident angle and the reflection angle correspond to each other.

According to some example embodiments, the driving method of the display device may further include calibrating a height of the user's eyeball for the display device.

According to some example embodiments, the calibrating may include initiating a request for the eye of the user to be at a first measurement region of the display device; measuring a first angle of the eye of the user for the first camera; initiating a request for the eye of the user to be at a second measurement region of the display device while maintaining the height of the eye of the user with respect to the display device; measuring a second angle of the eye of the user respect to the first camera; and determining a height of the eye of the user with respect to the display device based on the first angle, the second angle, and a distance between the first measurement region and the second measurement region.

According to some example embodiments, in the determining the reflection angle of the user's eyeball, the determined height of the eye of the user may be used.

According to some example embodiments, in determining the incident angle of the external light for the first region, the incident angle of the external light for the first photo sensor may be determined as the incident angle of the external light for the first region.

According to some example embodiments, in determining the reflection angle of the eye of the user for the first region, the reflection angle of the eye of the user with respect to the first region may be determined by correcting the reflection angle of the eye of the user with respect to the first camera using relative distances of the first region with respect to the first camera.

According to some example embodiments, in determining the reflection angle of the eye of the user for the first region, the reflection angle of the eye of the user with respect to the first region is determined by using the first camera and the second camera spaced apart from the first camera.

According to some example embodiments, in determining the incident angle of the external light for the first region, the three-dimensional position of the external light source for the display device is determined by using the first photo sensor and second photo sensor spaced apart from the first photo sensor, and the incident angle of the external light for the first region is determined by using the three-dimensional position of the external light source.

A photo sensor according to some example embodiments of the present invention, a display device including the same, and a driving method thereof can actively respond to reflection of external light by locally raising a luminance level at a portion of an image display surface where external light is reflected.

BRIEF DESCRIPTION OF THE DRAWINGS

FIGS. 3 to 6 illustrate a photo sensor according to some example embodiments of the present invention.

DETAILED DESCRIPTION

Figure 1:
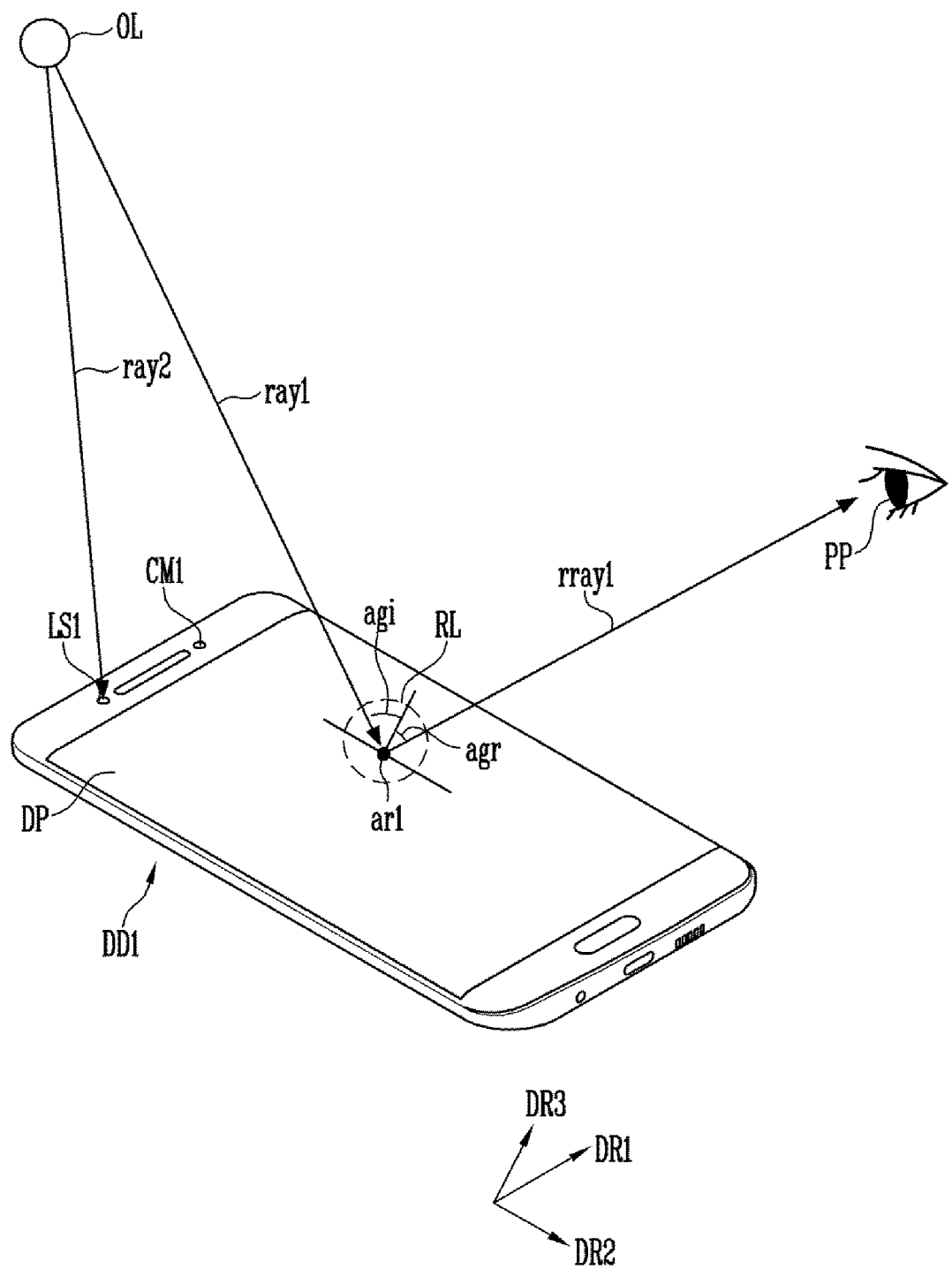
FIGS. 1 and 2 illustrate a display device according to some example embodiments of the present invention.

Hereinafter, with reference to accompanying drawings, aspects of various example embodiments of the present invention will be described in more detail so that those skilled in the art can more easily carry out the present invention. The present invention may be embodied in many different forms and is not limited to the example embodiments described herein.

In order to more clearly illustrate aspects of the present invention, parts that are not related to or necessary for understanding the description may be omitted, and the same or similar constituent elements are given the same reference numerals throughout the specification. Therefore, the above-mentioned reference numerals can be used in other drawings.

In addition, because the size and thickness of each configuration shown in the drawing are arbitrarily shown for better understanding and ease of description, the present invention is not necessarily limited to the illustrated one. In the drawings, the dimensions of layers and regions are exaggerated for clarity of illustration.

Figure 2:
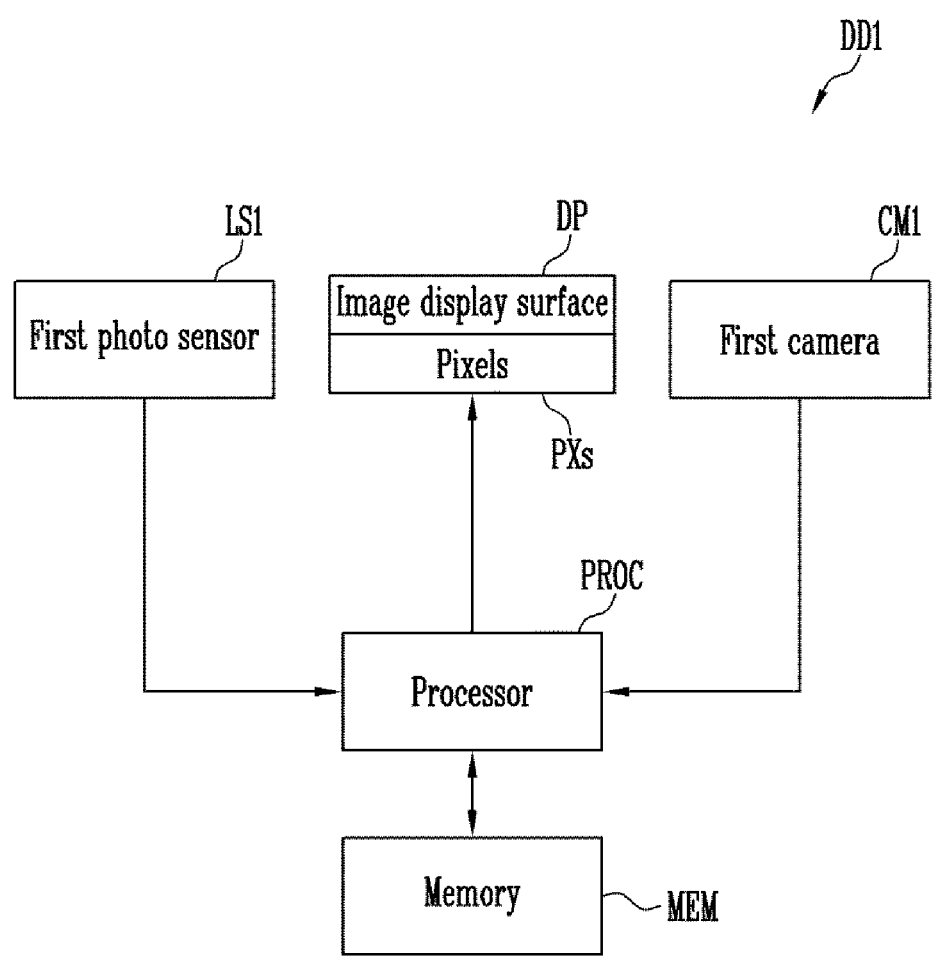

FIGS. 1 and 2 illustrate a display device according to some example embodiments of the present invention.

Referring to FIGS. 1 and 2, a display device DD1 according to some example embodiments of the present invention may include an image display surface DP, a first photo sensor LS1, and a first camera CM1.

In addition, the display device DD1 may include at least one processor PROC and memory MEM. The memory MEM may be a memory element for storing digital information or analog information. The processor PROC may be a dedicated purpose processor for implementing a specific algorithm, or may be a general purpose processor capable of implementing various algorithms. According to some example embodiments, the display device DD1 may include or be connected to a memory, the memory storing instructions that, when executed by the processor PROC, cause the processor PROC to execute the functionality described herein. Additionally, the processor PROC may be a single processor, or may include a plurality of processors. For example, an algorithm described later may be implemented by a general purpose processor or may be implemented as a plurality of dedicated purpose processors implementing each part of the algorithm. In addition, the algorithm may be implemented as a combination of a general purpose processor and a dedicated purpose processor. Hereinafter, the operation of each part of the algorithm will be described by a general purpose processor for better understanding and ease of description, and a person which is an ordinary skill in the art may manufacture a dedicated purpose processor corresponding to each part of the algorithm.

The image display surface DP may correspond to an emitting surface of the pixels PXs. Each of the pixels PXs may emit light based on the corresponding grayscale value. The image display surface DP may display an image frame through a combination of the pixels PXs emitting light.

The pixels PXs may be included in a light emitting diode display panel, a liquid crystal display panel, or the like. In the light emitting diode display panel, each pixel may include at least one organic light emitting diode or inorganic light emitting diode. In addition, each pixel may include at least one quantum dot light emitting element. The display device DD1 can display an image frame because the light emitting diodes themselves emit light. The pixels in a liquid crystal display panel may adjust transmittance of light emitted from a backlight unit so that the display device DD1 can display the image frame. The transmittance of light can be controlled by a size and direction of an electric field applied to a liquid crystal layer corresponding to each pixel. A protective film or window may also be attached on the liquid crystal display panel.

The image display surface DP may be partitioned into arbitrarily-sized regions. Each region may include at least one pixel. For example, a size of each region may correspond to each pixel. The size of each region may be preset or may be set by the user after shipment or by an update of a manufacturer.

According to some example embodiments of the present invention, an arbitrary pixel is assumed to be a first region ar1. At this time, an emitting area of the corresponding pixel may correspond to the first region ar1.

For example, an external light source OL may emit an external light ray 1 having an incident angle agi (e.g., relative to the surface of the display device DD1 or a direction normal to the surface of the display device DD1) with respect to the first region ar1. The external light source OL may include the sun, external lighting, interior room lighting, and the like.

The processor PROC may determine the incident angle agi of the external light source OL with respect to the first region ar1 by using the first photo sensor LS1. The configuration of the first photo sensor LS1 according to some example embodiments of the present invention will be described in more detail with reference to FIGS. 2 to 5. According to some example embodiments of the present invention, the processor PROC can determine intensity as well as the incident angle agi of the external light source OL by using the first photo sensor LS1.

The processor PROC may determine a reflection angle agr of a user's eyeball PP (e.g., relative to a display surface of the display device DD1 or a direction normal to the the display surface of the display device DD1) with respect to the first region ar1 by using the first camera CM1. The first camera CM1 may include any suitable camera. A determination process of the reflection angle agr using the first camera CM1 will be described in more detail with reference to FIGS. 6 to 10.

When the incident angle agi and the reflection angle agr correspond to each other in the first region ar1, the processor PROC can raise the luminance of the first region ar1. For example, when the incidence angle agi and the reflection angle agr coincide with each other in the first region ar1, it may be difficult for the user to visually recognize an image display in the first region ar1 by the reflection light rray1 of the external light ray1. Therefore, the processor RPOC locally raises the luminance level of at the first region ar1, so that the user can more easily recognize the image displayed in the first region ar1 despite the reflection light rray1.

An image of the external light source OL is also formed in a peripheral region RL of the first region ar1 according to the size and shape of the external light source OL, it may be difficult for the user to visually recognize the image of the peripheral region RL. The processor PROC may locally raise the luminance of the peripheral region RL by repeating the above-described process for the peripheral region RL of the first region ar1. According to some example embodiments of the present invention, the processor RPOC may locally raise the luminance level without performing the above-described process (e.g., immediately) for the peripheral region RL within the range (e.g., the predetermined range) from the first region ar1 when locally raising the luminance of the first region ar1.

Hereinafter, in order to explain the exact position, it is assumed that the image display surface DP is located on a plane extending in a first direction DR1 and a second direction DR2, which are orthogonal to each other. It is assumed that a third direction DR3 is a direction orthogonal to the first direction DR1 and the second direction DR2 and is a direction vertical to the image display surface DP. The incidence angle agi and the reflection angle agr described above refer to an angle with respect to an axis of the third direction DR3 in the first region ar1.

However, the above-described assumption is for accurate positional description, so the image display surface DP may not be planar when the display panel is flexible.

FIGS. 3 to 6 drawings are for a photo sensor according to some example embodiments of the present invention.

Referring to FIGS. 3 to 6, the first photo sensor LS1 according to some example embodiments of the present invention may include a substrate SUB1, photo sensor units PD1, PD2, PDc, PDt, and the like, and a cover CV.

Figure 3:
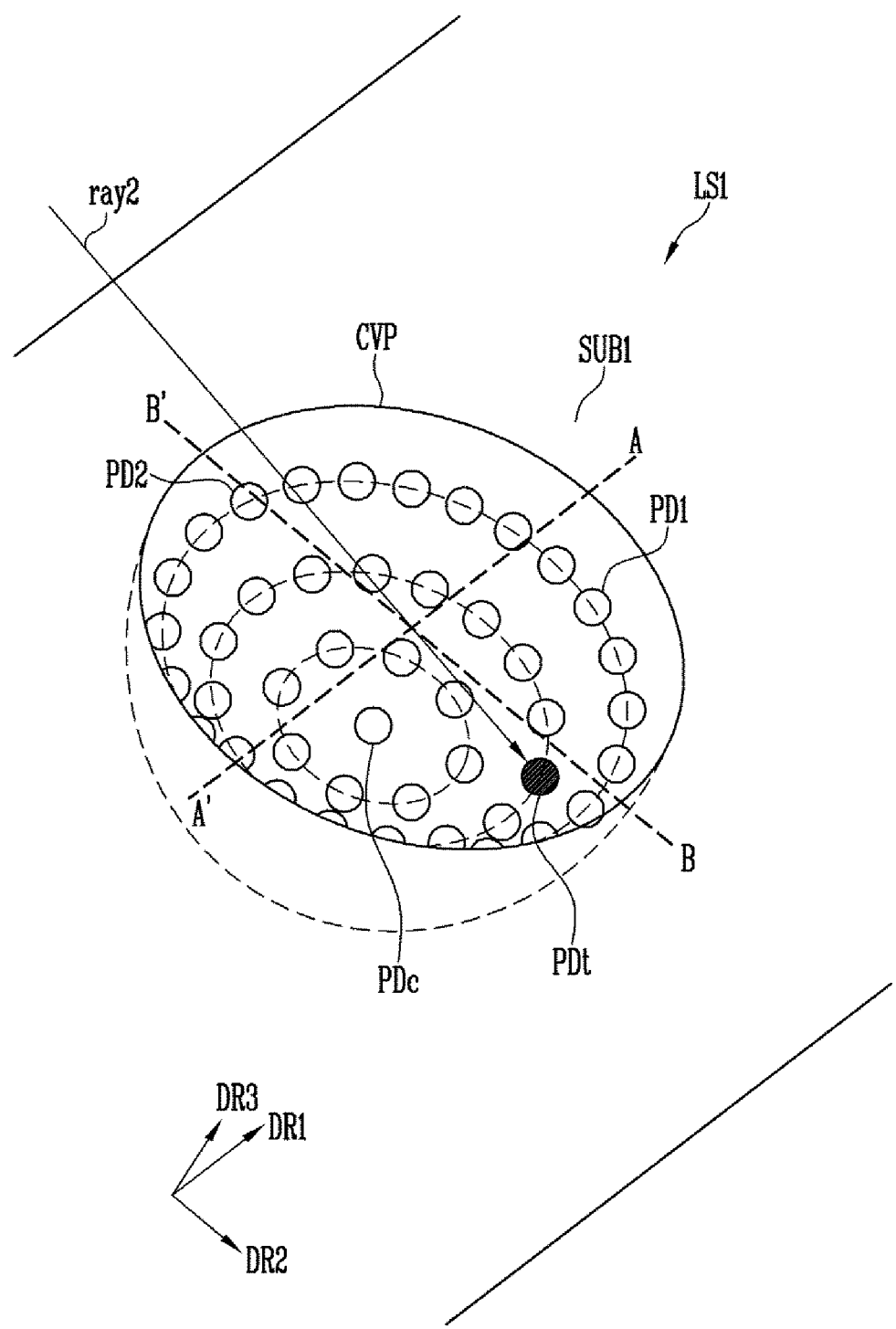
Figure 5:
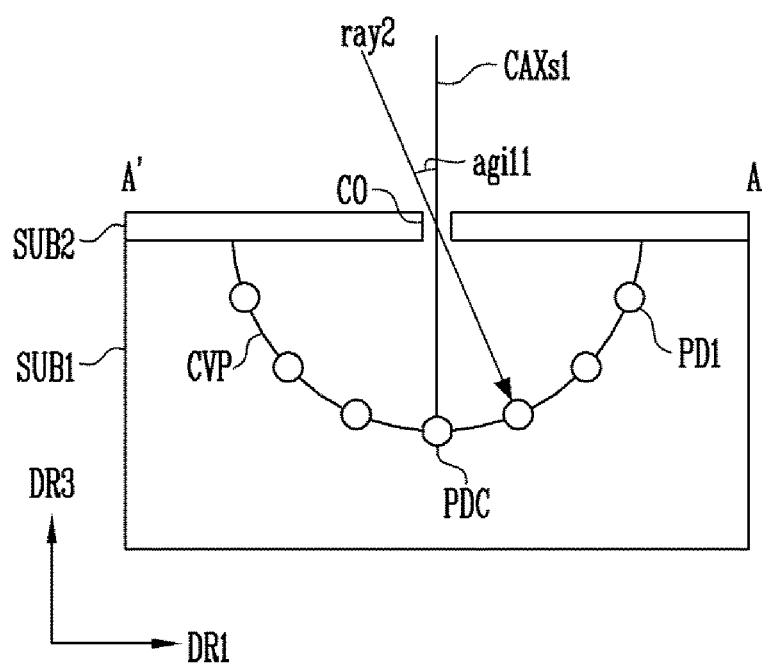
Figure 6:
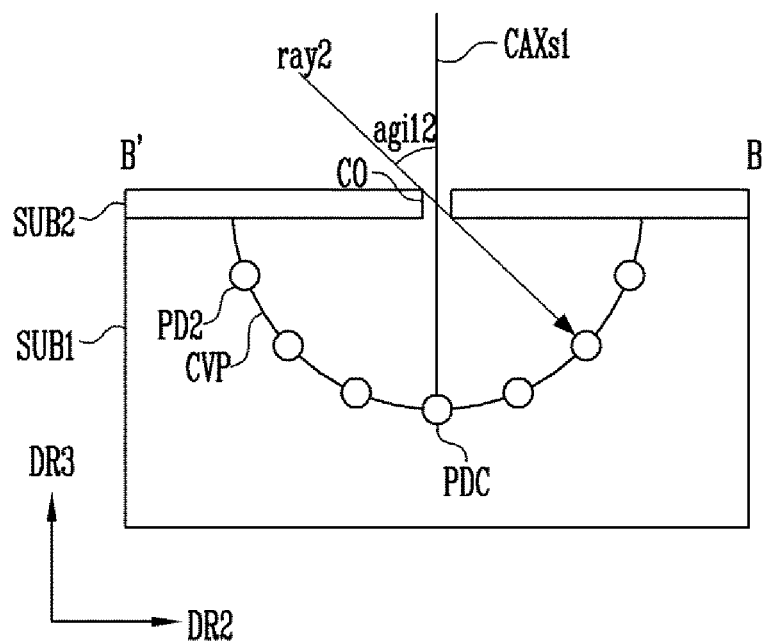

FIG. 3 is a drawing for illustrating the substrate SUB1, and FIG. 4 is a drawing for illustrating a case where the cover CV is positioned on the substrate SUB1 of FIG. 3. FIG. 5 is a cross-sectional view taken along a line A-A' of FIGS. 3 and 4, and FIG. 6 is a cross-sectional view taken along a line B-B' of FIGS. 3 and 4.

The substrate SUB1 includes a concave surface CVP. The concave surface CVP may be a hemisphere shape. The substrate SUB1 may be made of hard material such as glass, plastic, metal. If the concave surface CVP can support the photo sensor units PD1, PD2, PDc, PDt, and the like, the material of the substrate SUB1 is not limited.

The photo sensor units PD1, PD2, PDc, PDt, and the like may be arranged on the concave surface CVP. The photo sensor units PD1, PD2, PDc, PDt, and the like may be formed of a photo diode, a photo transistor, a photo conductive cell, a photo coupler, a photo interrupter, a thermopile, a bolometer, a photoelectric tube, and the like.

The cover CV may cover the concave surface CVP, may be spaced apart from the photo sensor units PD1, PD2, PDc, PDt, and the like, and may include a transmissive region and a non-transmissive region. The cover CV may include the second substrate SUB2. The second substrate SUB2 may be formed of an opaque material. For example, the transmissive region may correspond to an opening CO of the second substrate SUB2. At this time, the non-transmissive region may refer to a remaining region except for the opening CO in the second substrate SUB2. For another example, the transmissive region may be formed of a transparent material (e.g., glass, plastic, metal, etc.) rather than an opening in the second substrate SUB2. For another example, the second substrate SUB2 may be formed of a transparent material, and an opaque film or the like may be attached to the non-transmissive region. Hereinafter, for better understanding and ease of description, it is assumed that the transmissive region corresponds the opening CO and the non-transmissive region corresponds the substrate SUB2 except for the opening CO.

When the concave surface CVP is a hemisphere shape, the transmissive region may be positioned corresponding to a center of the hemisphere shape. The center of the hemisphere shape may refer to a specific position with the same distance to any positions on a hemisphere surface. For example, the distances from the transmission region to the photo sensor units PD1, PD2, PDc, PDt, and the like may be equal to each other.

The processor PROC may determine a target photo sensor unit PDt that generates the largest signal (e.g., a current signal or a voltage signal) for the external light source OL of the photo sensor units PD1, PD2, PDc, PDt, and the like. The processor PROC can determine the incident angle of the external light ray2 using the relative position to the target photo sensor unit PDt from the opening CO.

For example, the processor PROC may determine the three-dimensional position of the target photo sensor unit PDt using a spherical coordinate system with the opening CO as its origin. In addition, the processor PROC may determine the three-dimensional position of the photo sensor unit PDt with respect to the opening CO using a Cartesian coordinate system with respect to an arbitrary origin.

Hereinafter, to simplify the representation, angles of the external rays ray1 and ray2 and the reflection light rray1 are defined in a first plane based on the first direction DR1 and the third direction DR3, and angles of the external rays ray1 and ray2 and the reflection light rray1 are defined in a second plane based on the second direction DR2 and the third direction DR3. By combining the angles in the first and second planes that are not parallel to each other, the angle in the three-dimensional space may be defined.

For example, FIG. 5 shows the incidence angle agi11 of the external light ray2 with respect to an optical axis CAXs1 in the first plane, and FIG. 6 shows the incident angle agi12 of the external light ray2 with respect to the optical axis CAXs1 in the second plane. The optical axis CAXs1 is defined as an axis passing through the center of the opening CO in the third direction DR3. By combining the incidence angle agi11 in the first plane and the incidence angle agi12 in the second plane, the incident angle of the external light ray2 in the three-dimensional space may be defined.

The above-described angular representation method does not limit the method of determining the angles of the external lights ray1 and ray2 and the reflection light rray1, and explains that the angles of the external light ray1 and ray2 and the reflection light rray1 may be expressed in various aspects.

The processor PROC may determine the incident angle agi of the external light ray1 with respect to the first region ar1 of the image display surface DP using the first photo sensor LS1. For example, the processor PROC may determine the incident angle of the external light ray2 with respect to the first photo sensor LS1 as the incident angle agi of the external light ray1 with respect to the first region ar1. The incidence angles of the external lights ray1 and ray2 are shown to be different from each other due to the limitation of a paper in FIG. 1, but the incident angles of the external rays ray1 and ray2 may be substantially the same when the external light source OL is far enough away from the display device DD1.

FIGS. 7 to 11 illustrate a process for determining a position of the eye of a user.

The processor PROC may determine the reflection angle agr of the user's eyeball PP with respect to the first region ar1 by correcting the reflection angle agr of the user's eyeball PP with respect to the camera CM1 using the relative distances (−) ref1 and (+) ref2 of the first region ar1 with respect to the first camera CM1.

Figure 7:
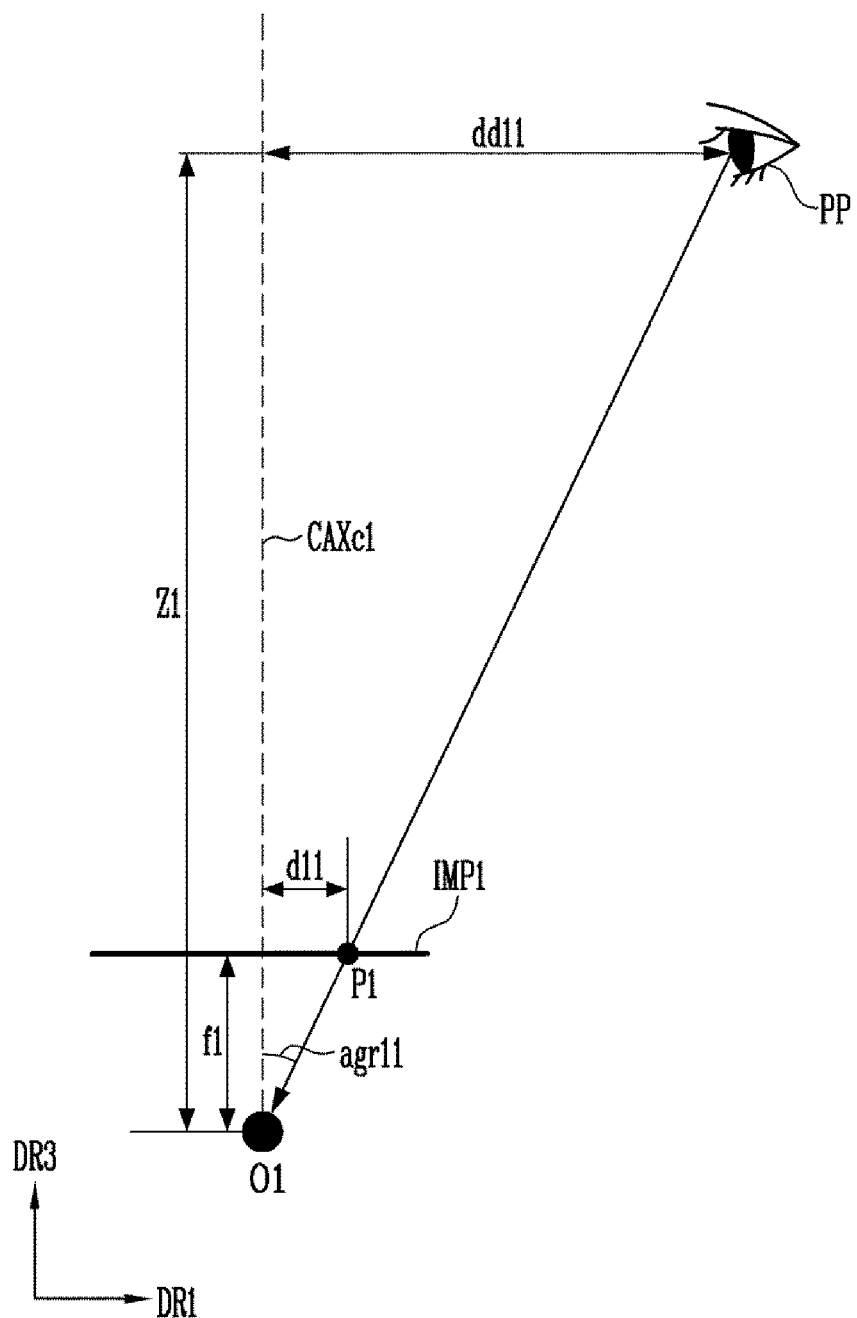
FIGS. 7 to 11 illustrate a process for determining a position of an eye of a user according to some example embodiments of the present invention.

First, referring to FIGS. 7 and 8, a method for determining the reflection angle agr of the user's eyeball PP with respect to the first camera CM1 will be described. Referring to FIG. 7, the reflection angle agr11 of the user's eyeball PP with respect to the first camera CM1 in the first plane is shown, and referring to FIG. 8, the reflection angle agr12 of the user's eyeball PP with respect to the first camera CM1 in the second plane is shown.

A focal length f1 from a first camera origin O1 to a first image plane IMP1 of the first camera CM1 may be a fixed parameter value of the first camera CM1. The optical axis CAXc1 of the first camera CM1 may pass through the first image plane IMP1 from the first camera origin O1 in the third direction DR3.

Referring to FIG. 7, the processor PROC may search for a point P1 where the image of the user's eyeball PP is located in the first image plane IMP1. Once the point P1 is determined, the processor PROC may measure a distance d11 from an intersection of the optical axis CAXc1 and the first image plane IMP1 to the point P1 in the first direction DR1. Therefore, the processor PROC may determine the reflection angle agr11 of the user's eyeball PP with respect to the first camera CM1 in the first plane using feature of a right-angled triangle.

When only one first camera CM1 is used, a height Z1 from the first camera origin O1 or the first camera CM1 to the user's eyeball PP cannot be measured.

However, the height Z1 may be set before shipment or may be set after shipment. In addition, as described in more detail later, the height Z1 may be calibrated by the user. If the height Z1 is determined, the distance dd11 from the first camera origin O1 or the first camera CM1 to the user's eyeball PP in the first direction DR1 can be determined using the feature of the right-angled triangle. Hereinafter, it is assumed that the height Z1 is determined to be a specific value.

Figure 8:
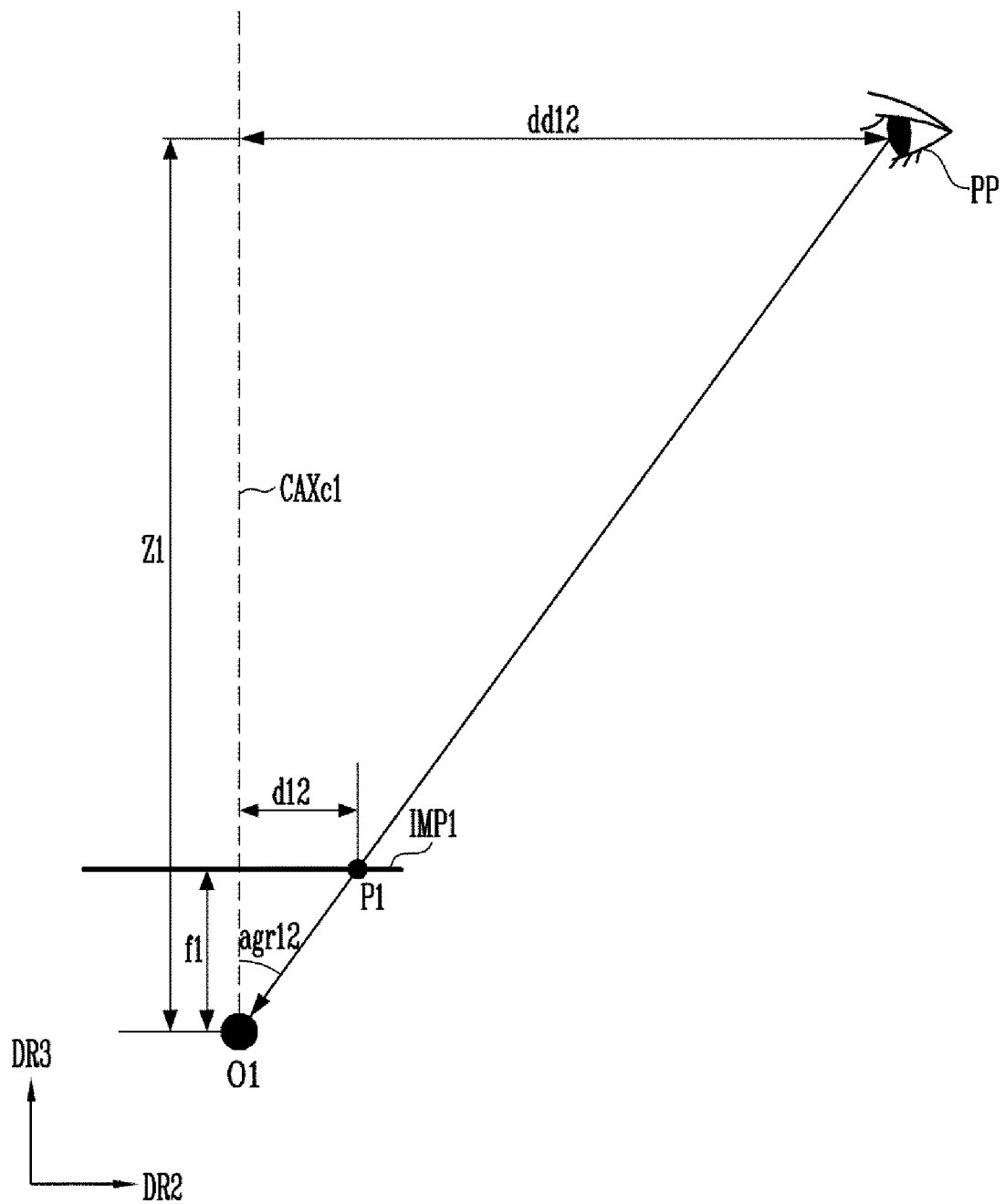

Referring to FIG. 8, in a similar manner, the processor PROC can measure a distance d12 from the intersection of the optical axis CAXc1 and the first image plane IMP1 to the point P1 in the second direction DR2. Therefore, the processor PROC determines the reflection angle agr12 of the user's eyeball PP with respect to the first camera CM1 in the second plane using the features of the right-angled triangle.

As described above, when assuming that the height Z1 is determined to be a specific value, the distance dd12 from the first camera origin O1 or first camera CM1 to the user's eyeball PP in the second direction DR2 using the feature of the right-angled triangle may be measured.

Figure 9:
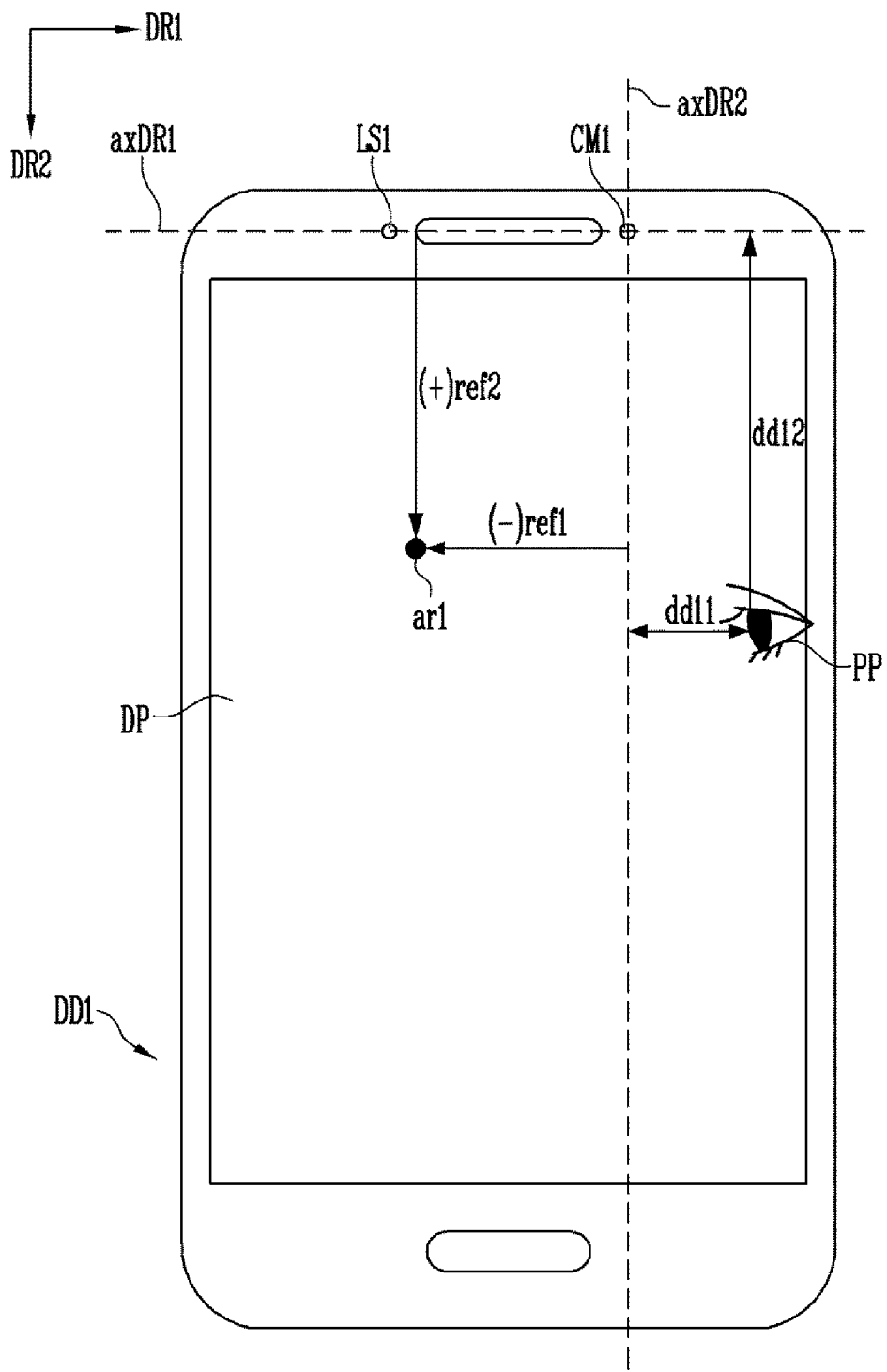

Referring to FIG. 9, relative distances (−) ref1 and (+) ref2 of the first region ar1 with respect to the first camera CM1 are illustratively shown.

The axis axDR2 may pass through the first camera CM1 and extend in the first direction DR1. The axis axDR1 may pass through the first camera CM1 and extend in the second direction DR2.

The first region ar1 may be located at a first distance (−) ref1 from the first camera CM1 in the opposite direction of the first direction DR1 and at a second distance (+) ref2 in the second direction DR2.

Thus, because the relative distances of each region with respect to the first camera CM1 are predetermined values, they may be created in the form of a look-up table LUT before shipment and stored in the memory MEM.

Figure 10:
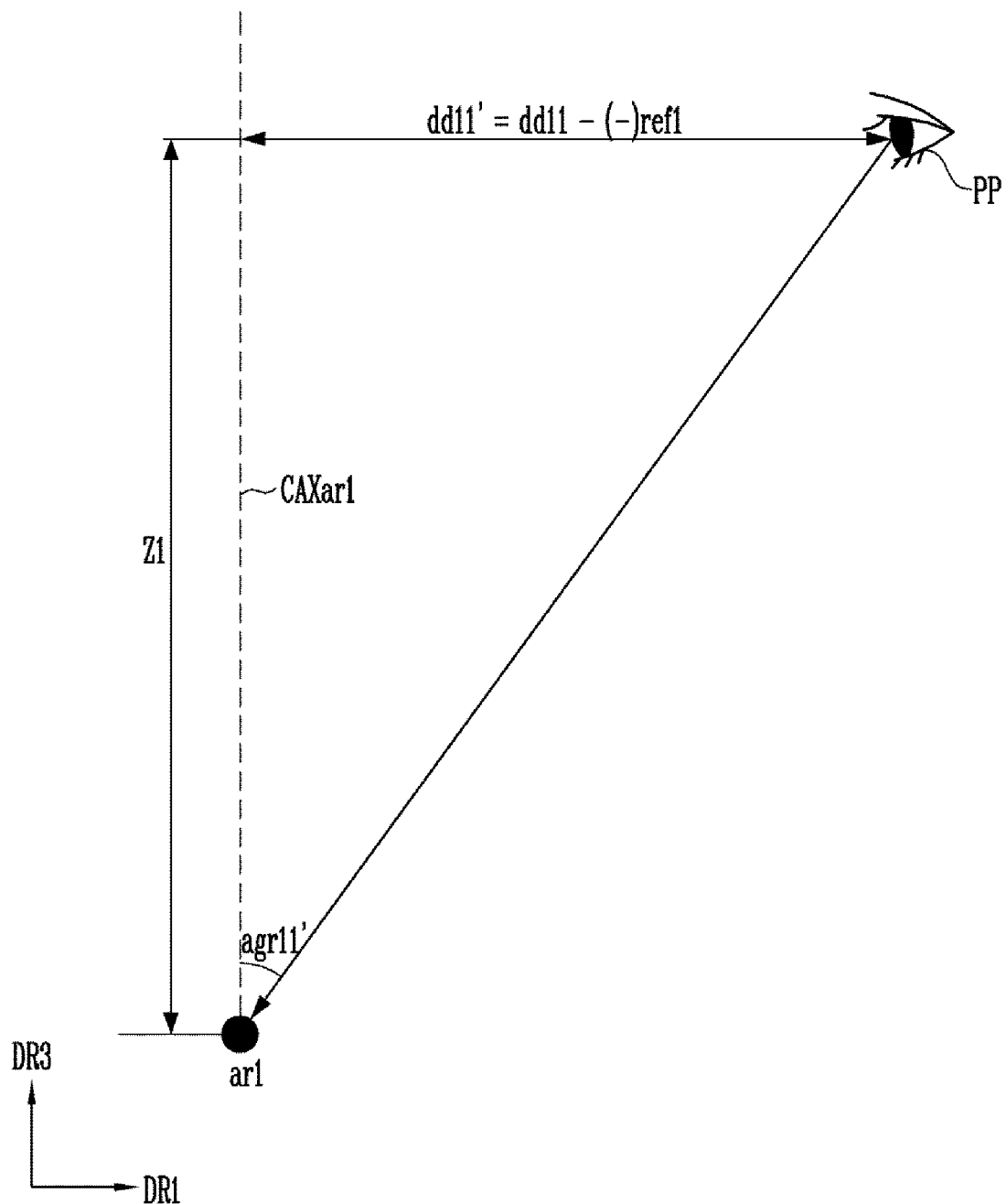

Referring to FIGS. 9 and 10, the processor PROC may calculate the distance dd11' from the first region ar1 to the user's eyeball PP in the first direction DR1 by calculating the difference between the distance dd11 and the first distance (−) ref1.

As described above, because the height Z1 is in a predetermined state, the processor PROC may determine the reflection angle agr11' of the user's eyeball PP with respect to the first region ar1 in the first plane using the feature of the right-angled triangle.

Figure 11:
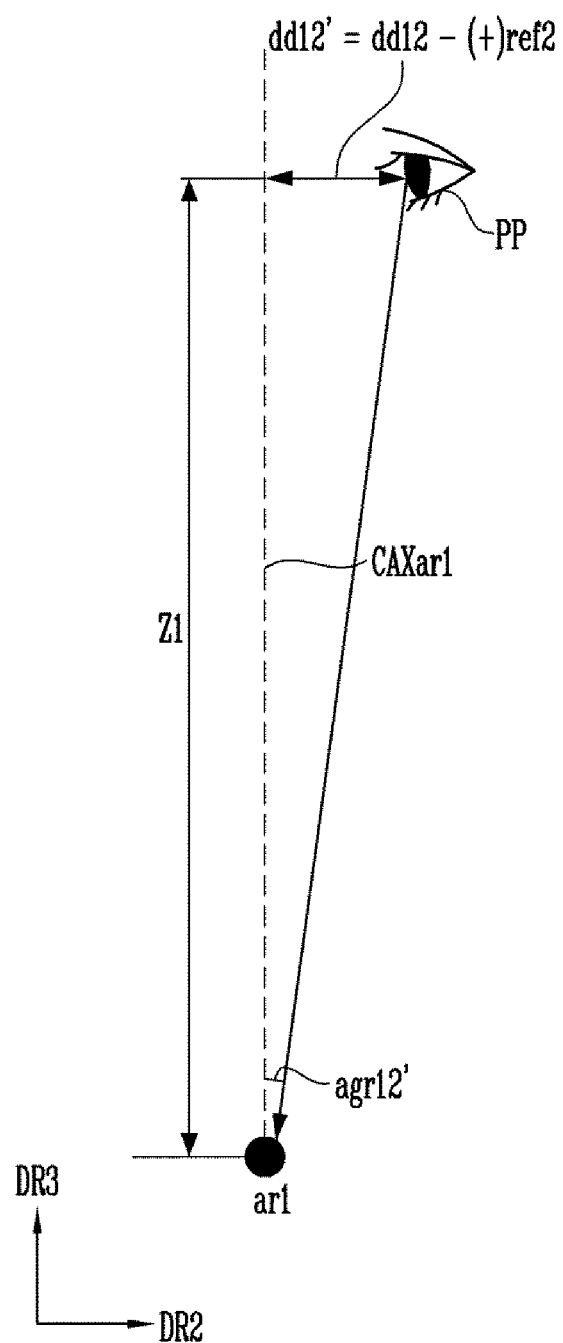

Referring to FIGS. 9 and 11, the processor PROC can calculate the distance dd12' from the first region ar1 to the user's eyeball PP in the second direction DR2 by calculating the difference between distance dd12 and second distance (+) ref2.

As described above, because the height Z1 is in a predetermined state, the processor PROC can determine the reflection angle agr12' of the user's eyeball PP with respect to the first region ar1 in the second plane using the feature of the right-angled triangle.

As described above, by combining the reflection angle agr11' in the first plane and the reflection angle agr12' in the second plane, the reflection angle agr in the three-dimensional space of the user's eyeball PP with respect to the first region ar1 may be defined.

Figure 12:
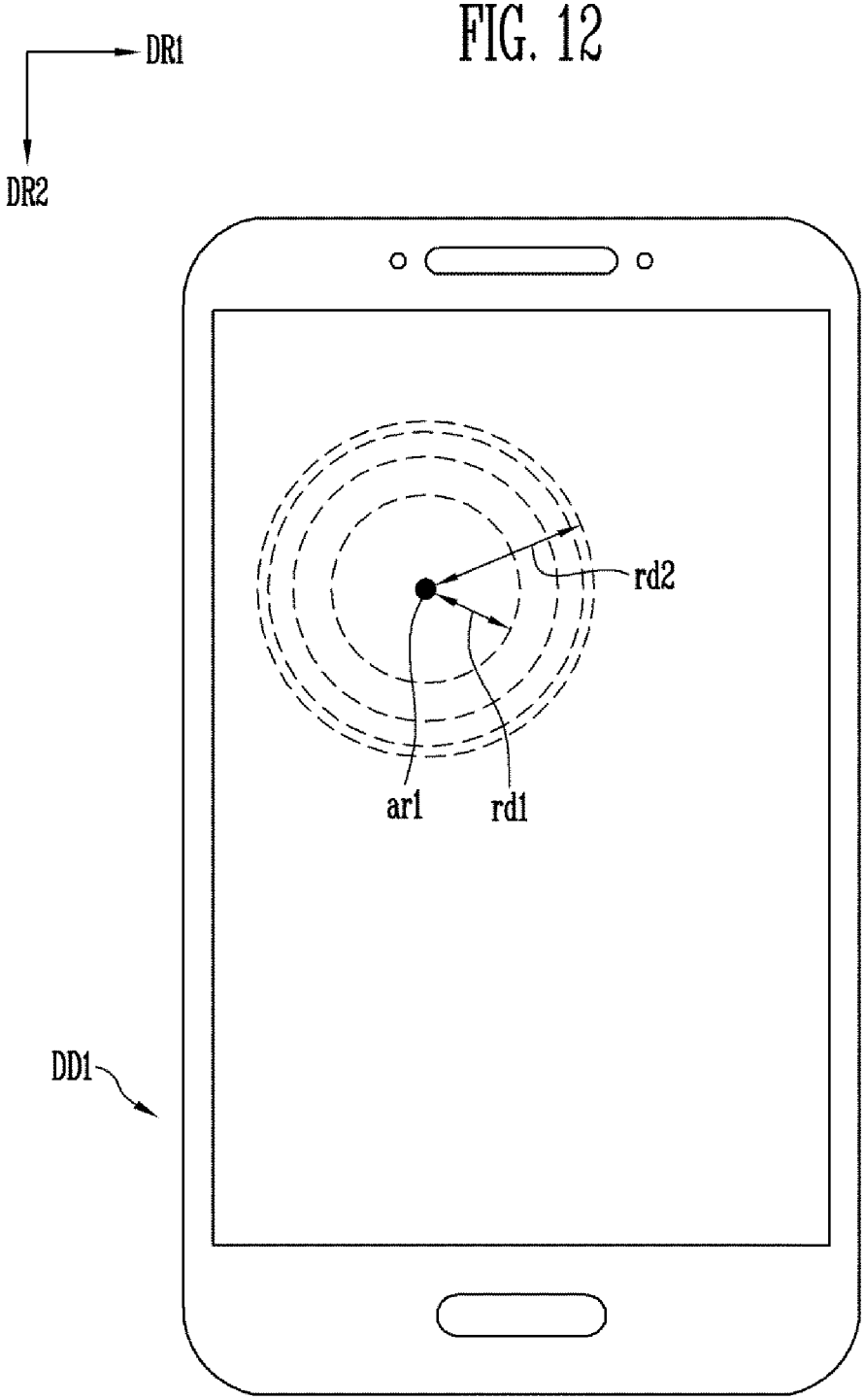
FIG. 12 illustrates a process in which a luminance level at a first region of an image display surface is increased according to some example embodiments of the present invention.

FIG. 12 is a drawing for illustrating a case increasing locally luminance of a first region of an image display surface.

The processor PROC may raise luminance of the first region ar1 when the incident angle agi and the reflection angle agr correspond to each other. As described above, when the incident angle agi with respect to the first region ar1 from the external light source OL corresponds to the reflection angle agr of the user's eyeball PP with respect to the first region ar1, it may be difficult for the user to visually recognize an image displayed in the first region ar1 by the reflection light rray1.

Therefore, the processor RPOC locally raises the luminance of the first region ar1, so that the user can more easily recognize the image displayed in the first region ar1 despite the reflection light rray1.

According to some example embodiments of the present invention, the processor PROC may locally raise the luminance of the peripheral region located at a predetermined distance rd1 from the first region ar1. At this time, an increase amount of the luminance in the peripheral region may be the same as an increase amount of the luminance in the first region ar1.

According to some example embodiments of the present invention, the processor PROC may locally raise the luminance of the peripheral region located at a predetermined distance rd2 from the first region ar1. At this time, as the distance from the first region ar1 increases, the increase amount of the luminance in the peripheral region may be reduced.

Therefore, the luminance difference between the first region ar1 where the luminance is raised and the peripheral region where the luminance is maintained (e.g., the peripheral region farther than the distance rd2) can be softly seen by the user.

Figure 13:
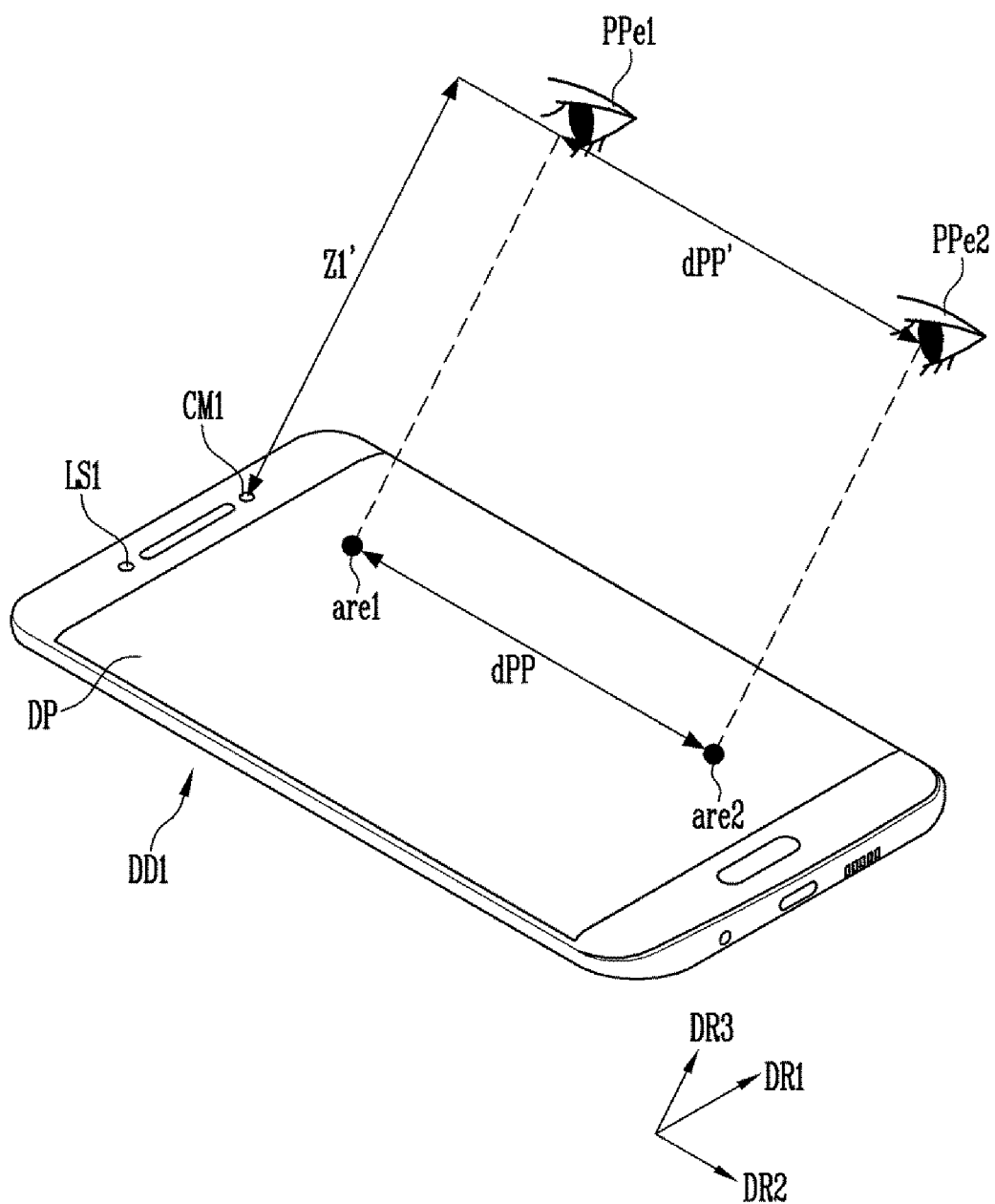
FIGS. 13 and 14 illustrate a process of calibrating a height of the eye of the user relative to the display device according to some example embodiments of the present invention.
Figure 14:
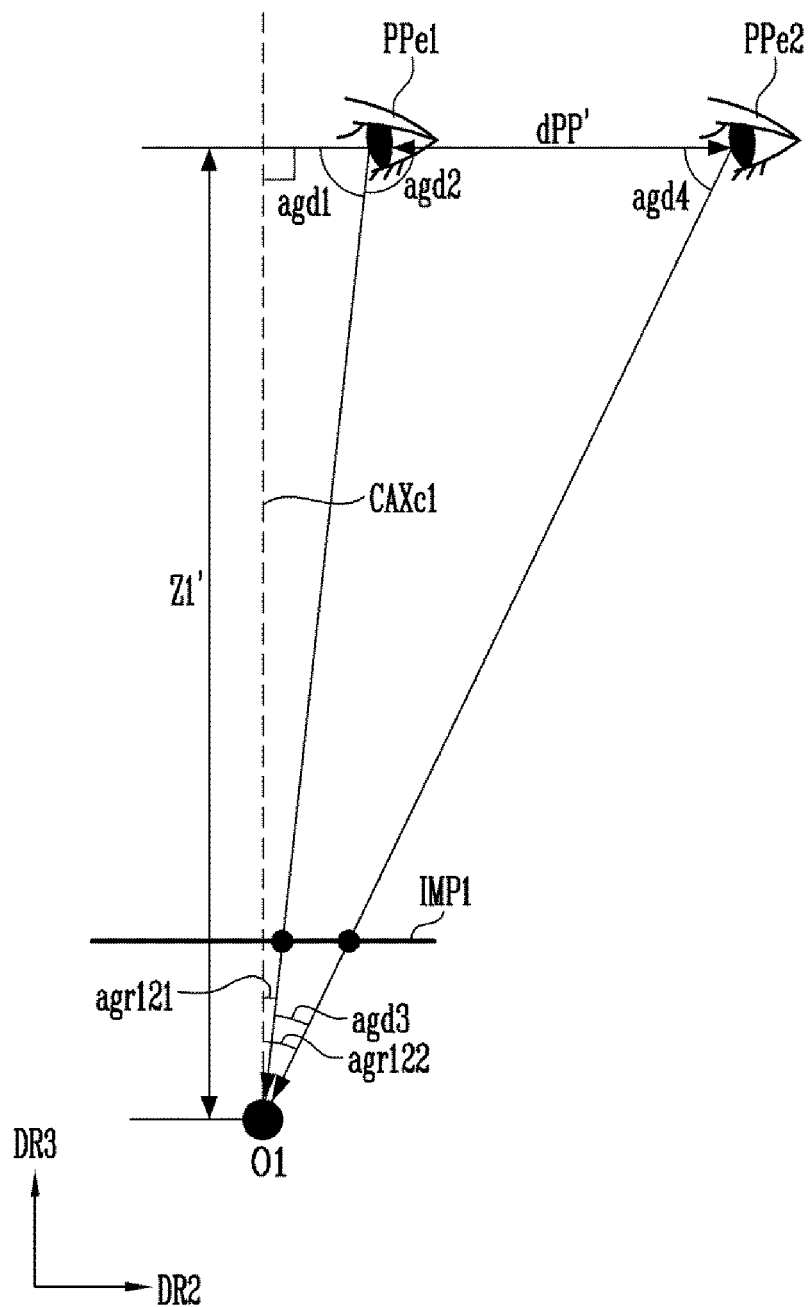

FIGS. 13 and 14 are drawings for illustrating a process of calibrating a height of the user's eyeball to the display device.

The processor PROC may calibrate the height Z1' of the user's eyeball with respect to the display device DD1.

First, the processor PROC may initiate a request that the user to position the user's eyeball PPe1 on a first measurement region are1. For example, the processor PROC may initiate display of an image (e.g., blinking, different color, higher luminance, etc.) that emphasizes the first measurement region are1 of the image display surface DP and request the user to position the user's eyeball PPe1 in the third direction DR3 from the first measurement region are1. The request can be performed with sound, image display, and the like.

After positioning the user's eyeball PPe1 on the first measurement region are1, the user can inform the processor PROC that the user's eyeball PPe1 is located on the first measurement region are1 by pressing the completion button or using voice recognition function.

Next, the processor PROC can measure a first angle agr121 of the user's eyeball PPe1 with respect to the first camera CM1. Refer to description of FIGS. 7 and 8 for the angle measurement method.

Next, the processor PROC may request that the user's eyeball PPe2 is located on the second measurement region are2 of the display device DD1 while maintaining the height Z1' of the user's eyeball PPe2 with respect to the display device DD1.

Through a process similar to that described above, the processor PROC can measure the second angle agr122 of the user's eyeball PPe2 with respect to the first camera CM1.

Next, the processor PROC may determine the height Z1' of the user's eyeball PPe1 with respect to the display device DD1 based on the first angle agr121, the second angle agr122 and a distance dPP between the first measurement region are1 and the second measurement region are2.

An angle agd1 is a difference value between 90 degrees and the angle agr121. An angle agd2 is a difference value between 180 degrees and the angle agd1. An angle agd3 is a difference value between the angles agr122 and the angle agr121. An angle agd4 is a value left by subtracting the angles agd2 and agd3 from 180 degrees.

Because the user has been requested to move by the distance dPP' while maintaining the height Z1' of the user's eyeball PPe1 or PPe2, it may be assumed that the distance dPP' is the same as the distance dPP.

Therefore, because a triangle connecting a position before the movement of the user's eyeball PPe1, a position after the movement of the user's eyeball PPe2, and the first camera origin O1 can be specified, the processor PROC can calculate the height Z1'.

The processor PROC can use the determined height Z1' of the user's eyeball PP in the process of determining the reflection angle agr of the user's eyeball PP. For example, the processor PROC may replace the height Z1 with the height Z1' in the process of FIG. 7 to 11.

According to some example embodiments of the present invention, only one first camera CM1 may be enabled to determine the reflection angle agr of the user's eyeball PP.

Figure 15:
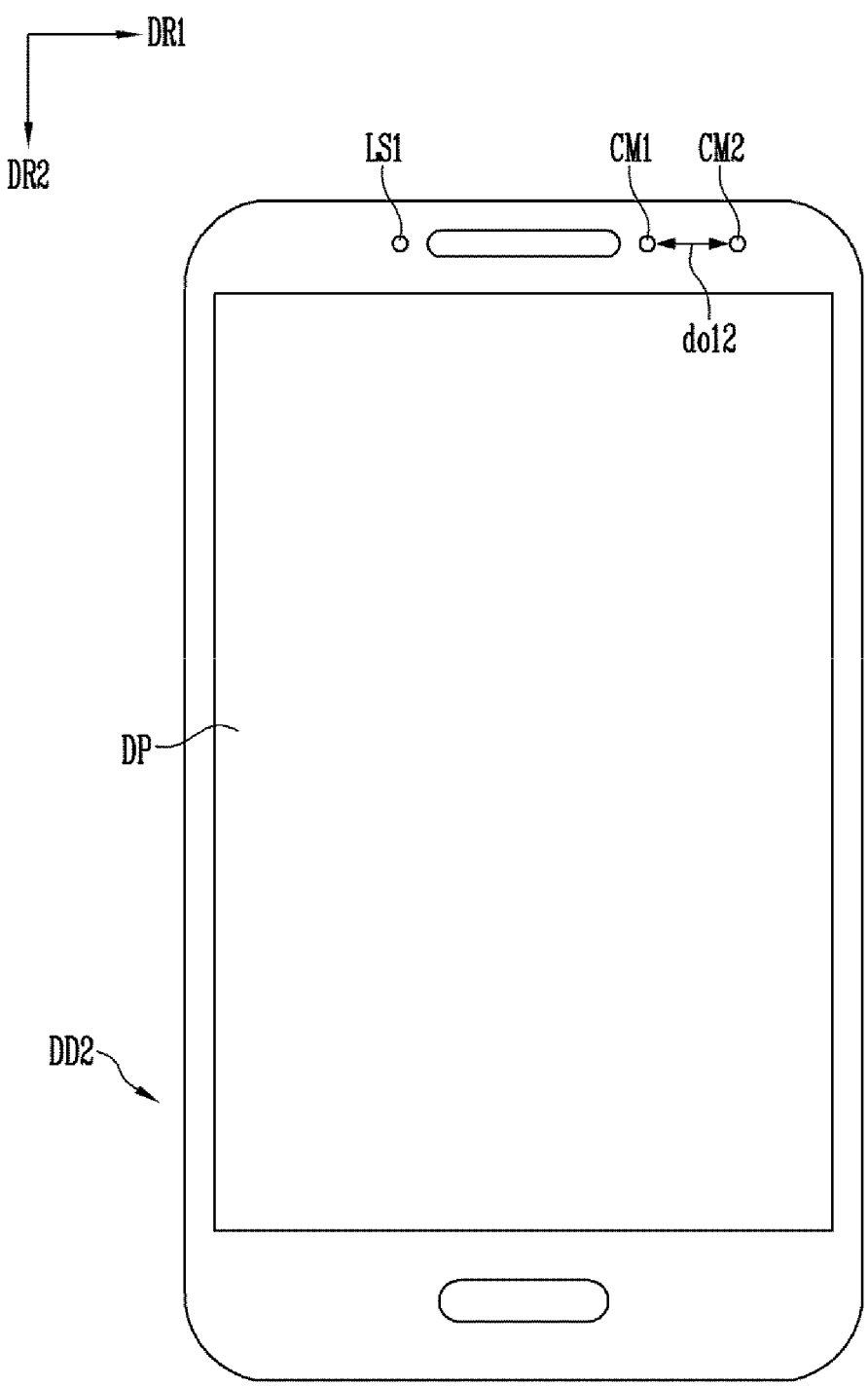
FIGS. 15 and 16 illustrate a process of determining a three-dimensional position of the eye of the user using two cameras according to some example embodiments of the present invention.
Figure 16:
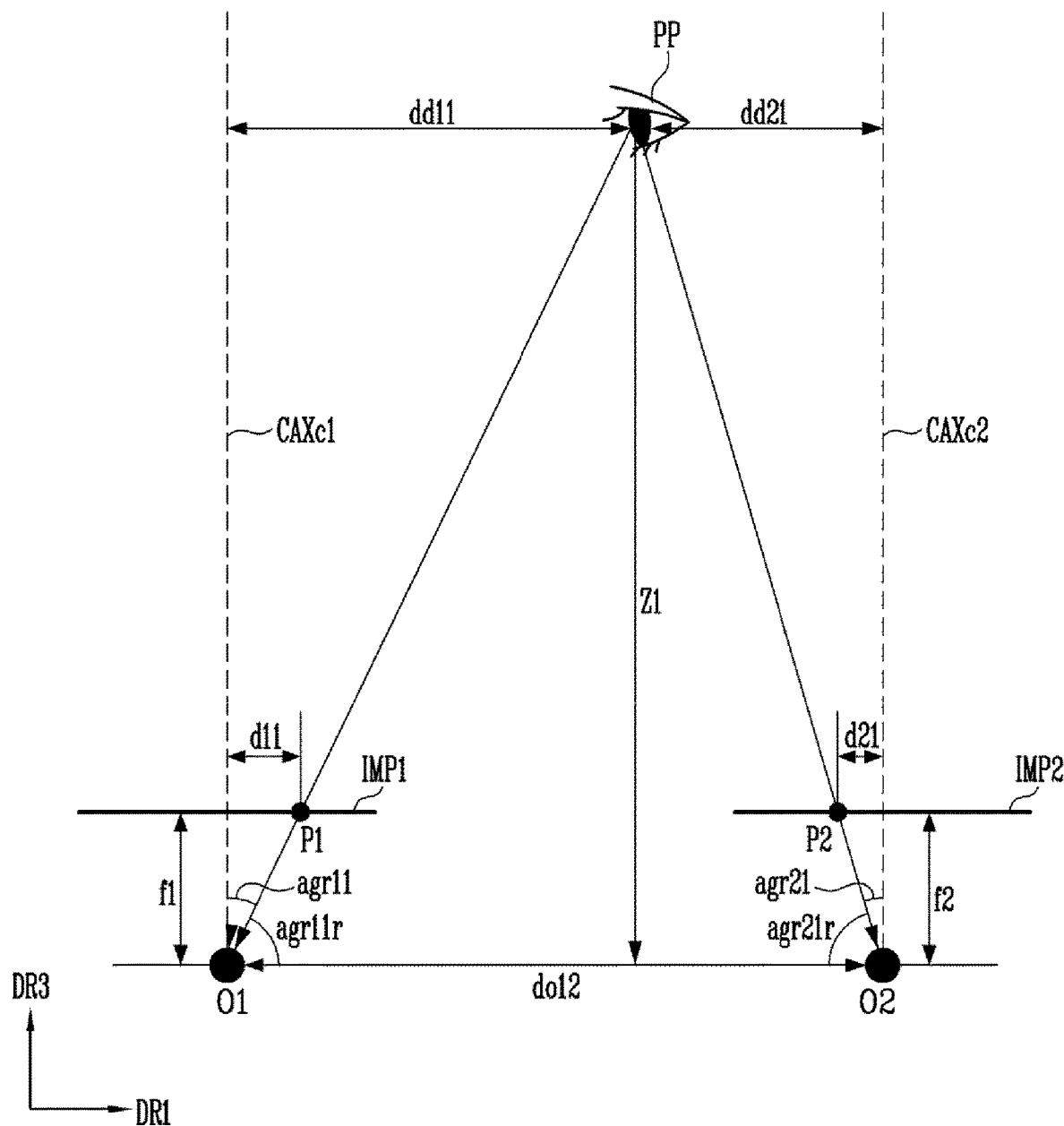

FIGS. 15 and 16 are drawings of a process of determining a three-dimensional position of the user's eye using two cameras.

Referring to FIG. 15, the display device DD2 may further include the second camera CM2 as compared to the display device DD1 of FIG. 1. The second camera CM2 may be spaced apart from the first camera CM1 by a distance do12.

Referring to FIG. 16, a process of calculating the height Z1 of the user's eyeball PP using triangulation is shown.

The first camera CM1 can calculate the angle agr11 using a focal distance f1 and a distance d11. The focal distance f1 is a distance from the first camera origin O1 to the first image plane IMP1. The distance d11 refers to an interval from the intersection of an axis CAXc1 and the first image plane IMP1 to the point P1 at which the image of the user's eyeball PP is formed on the first image plane IMP1.

The second camera CM2 can calculate the angle agr21 using a focal distance f2 and a distance d21. The focal distance f2 is a distance from the second camera origin O2 to the second image plane IMP2. The distance d21 refers to an interval from the intersection of an axis CAXc2 to the second image plane IMP2 to the point P2 at which the image of the user's eyeball PP is formed on the second image plane IMP2.

The angle agr11r corresponds to the difference between the angle 90 and the angle agr11, and the angle agr21r corresponds to the difference between the angle 90 and the angle agr21. A distance between the first camera origin O1 and the second camera origin O2, that is, a distance do12 corresponding to a length of a base line is a predetermined value.

Therefore, because a triangle connecting the first camera origin O1, the second camera origin O2 and the user's eyeball PP can be specified, the processor PROC can calculate the height Z1.

According to some example embodiments of the present invention, a calibration process may be omitted and the height Z1 of the user's eyeball PP can be measured in real time.

In addition, a person of an ordinary skill in the art may obtain the height Z1 of the user's eyeball PP using other methods of stereo vision. For example, there is a method using epipolar geometry.

Figure 17:
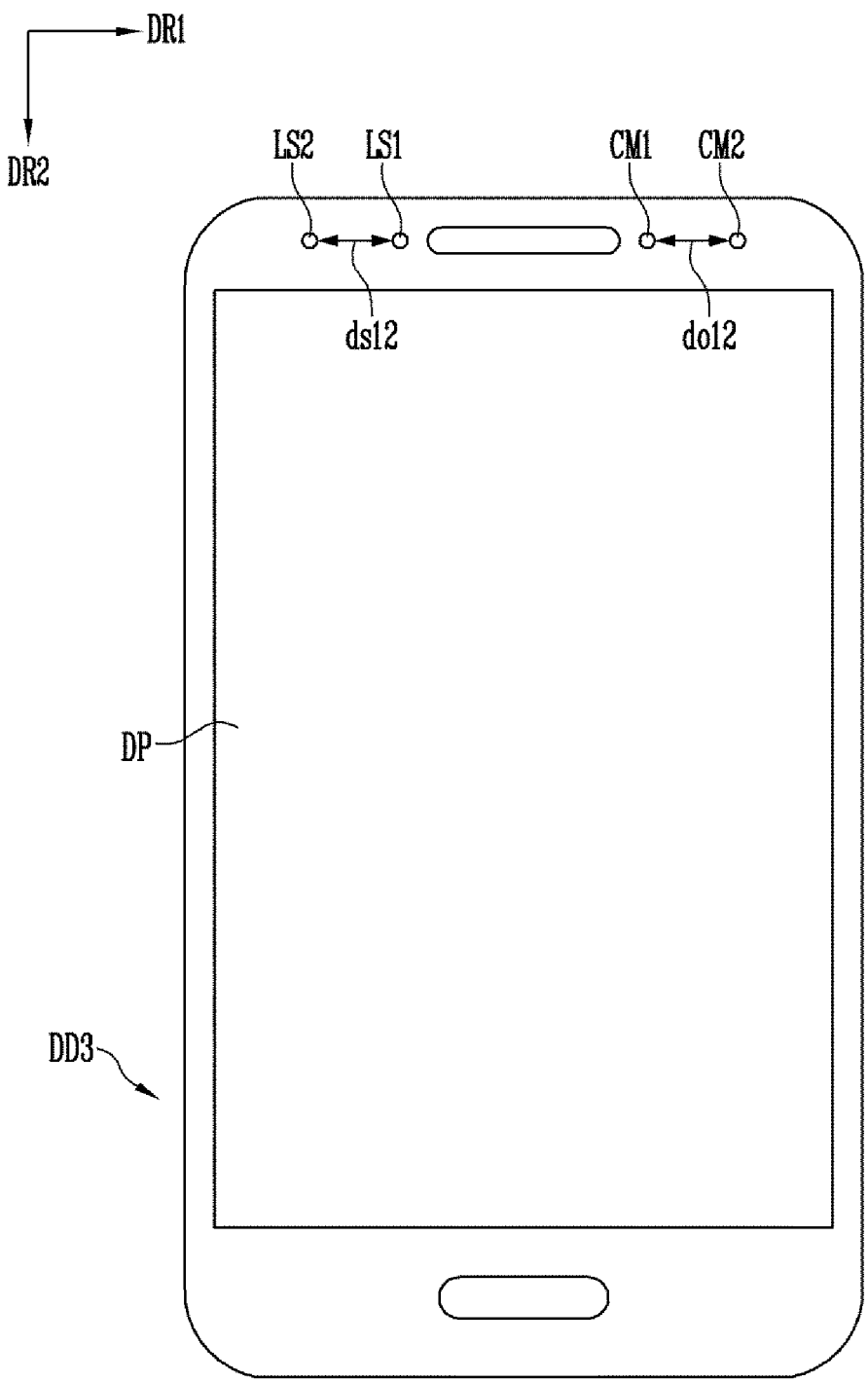
FIGS. 17 and 18 illustrate a process of determining a three-dimensional position of an external light source using two photo sensors according to some example embodiments of the present invention.
Figure 18:
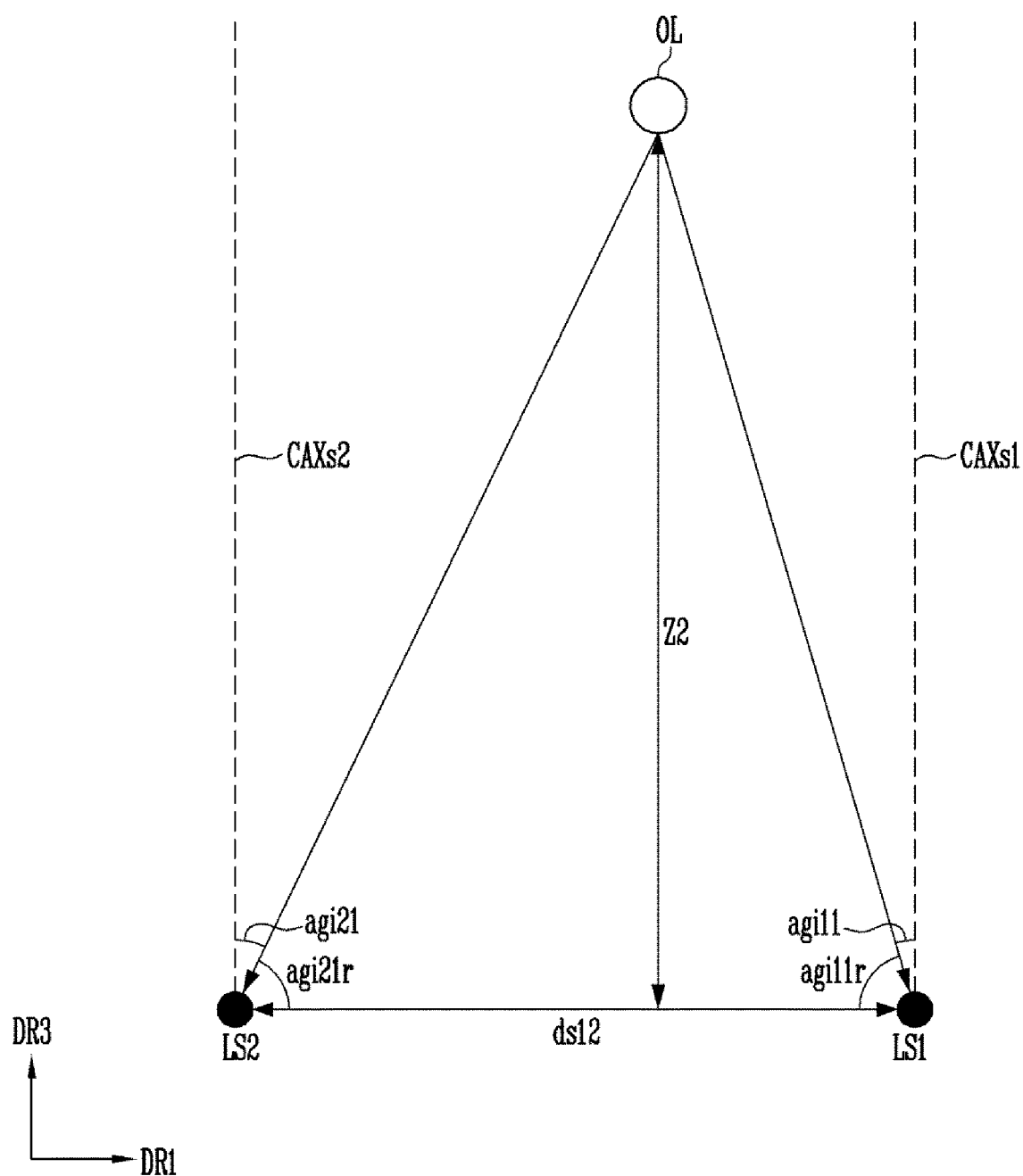

FIGS. 17 and 18 are drawings for illustrating an a process of determining a three-dimensional position of an external light source using two photo sensors.

Referring to FIG. 17, the display device DD3 may further include a second photo sensor LS2 unlike the display device DD1 of FIG. 1. The second photo sensor LS2 may be spaced apart from the first photo sensor LS1 by a distance ds12.

Because the configuration of the second photo sensor LS2 may be substantially the same as that of the first photo sensor LS1, some duplicate descriptions thereof will be omitted.

The processor PROC can determine the three-dimensional position of the external light source OL with respect to the display device DD3 using the first photo sensor LS1 and the second photo sensor LS2.

As described above, the processor PROC may obtain the incident angle agi21 of the external light with respect to the first photo sensor LS1 from the external light source OL. Similarly, the processor PROC may obtain the incident angle agi11 of the external light with respect to the second photo sensor LS2 from the external light source OL. The incident angle agi11 is based on the optical axis CAXs1 of the first photo sensor LS1 and the incident angle agi21 is based on the optical axis CAX2 of the second photo sensor LS2.

The angle agi21r corresponds to the difference of 90 degrees and the incidence angle agi21, and the angle agi11r corresponds to the difference of 90 degrees and the incidence angle agi11. The distance ds12 may be a predetermined value.

Therefore, because a triangle connecting the first photo sensor LS1, the second photo sensor LS2 and the external light source OL may be specified, the processor PROC can calculate the height Z2 of the external light source OL.

According to some example embodiments of the present invention, the height Z2 or the three-dimensional position of the external light source OL may be specified in real time when the external light source OL is not located far enough away from the display device DD3.

The processor PROC can determine the incident angle of the external light with respect to the first region ar1 using the three-dimensional position of the external light source OL.

Referring to FIGS. 9 to 11, by correcting the reflection angles agr11 and agr12 of the user's eyeball PP with respect to the first camera CM1 with the relative distances (−) ref1 and (+) ref2 of the first region ar1 with respect to the first camera CM1, the process of determining the reflection angles agr11' and agr12' of the user's eyeball PP with respect to the first region ar1 has been described. Similarly, by correcting the incident angles agi11 and agi12 of the external light source OL with respect to the first photo sensor LS1 with the relative distances of the first region ar1 with respect to the first photo sensor LS1, the incident angle of the external light source OL with respect to the first region ar1 can be determined. Some duplicate descriptions will be omitted.

Therefore, when the external light source OL is not located far enough away from the display device DD3, embodiments of the present invention may more accurately calculate the incidence angle with respect to the first region ar1.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

The drawing and the detailed description of the present invention referred to above are descriptive only and are used for the purpose of illustration only and are not intended to limit the meaning thereof or to limit the scope of the invention described in the claims and their equivalents. Accordingly, a person having ordinary skill in the art will understand from the above that various modifications and other equivalent embodiments are also possible. Therefore, the real protective scope of the present invention shall be determined by the technical scope of the accompanying claims and their equivalents.

What is claimed is:

1. A photo sensor comprising:
   a first substrate including a concave surface;
   a plurality of photo sensor units on the concave surface;
   a cover covering the concave surface, the cover being spaced apart from the photo sensor units, and including a transmissive region and a non-transmissive region;

a processor; and a memory coupled to the processor, the memory storing instructions that, when executed by the processor, cause the processor to calibrate a height of an eye of a user relative to the photo sensor.

2. The photo sensor of claim 1, wherein the concave surface has a hemisphere shape.

3. The photo sensor of claim 2, wherein the transmissive region corresponds to a center of the hemisphere shape.

4. The photo sensor of claim 3, wherein
the cover includes a second substrate, and
the transmissive region corresponds to an opening of the second substrate.

5. The photo sensor of claim 1, wherein distances from the transmission region to the photo sensor units are the same.

6. A display device comprising:
an image display surface;
a first camera;
a first photo sensor;
a processor; and
a memory coupled to the processor, the memory storing instructions that, when executed by the processor, cause the processor to:
calibrate a height of an eye of a user of the display device;
determine an incident angle of external light with respect to a first region of the image display surface using the first photo sensor;
determine a reflection angle of the eye of the user with respect to the first region using the first camera; and
raise a luminance level at the first region when the incident angle and the reflection angle correspond to each other.

7. The display device of claim 6, wherein
the instructions further cause the processor to determine an incident angle of the external light with respect to the first photo sensor to the incident angle of the external light with respect to the first region.

8. The display device of claim 6, wherein
the instructions further cause the processor to determine the reflection angle of the eye of the user with respect to the first region by correcting the reflection angle of the eye of the user with respect to the first camera using relative distances of the first region with respect to the first camera.

9. The display device of claim 6, further comprising
a second camera spaced apart from the first camera,
wherein the instructions further cause the processor to determine the reflection angle of the eye of the user for the first region by using the first camera and the second camera.

10. The display device of claim 6, further comprising
a second photo sensor spaced apart from the first photo sensor,
wherein the instructions further cause the processor to determine a three-dimensional position of an external light source for the display device by using the first photo sensor and the second photo sensor, and
the instructions further cause the processor to determine the incident angle of the external light with respect to the first region by using the three-dimensional position of the external light source.

11. The display device of claim 6, wherein the first photo sensor includes:
a first substrate including a concave surface;
a plurality of photo sensor units on the concave surface; and
a cover covering the concave surface, the cover being spaced apart from the photo sensor units, and including a transmissive region and a non-transmissive region.

12. The display device of claim 10, wherein the first photo sensor or the second photo sensor includes:
a first substrate including a concave surface;
a plurality of photo sensor units on the concave surface; and
a cover covering the concave surface, the cover being spaced apart from the photo sensor units, and including a transmissive region and a non-transmissive region.

13. A driving method of a display device comprising:
calibrating a height of an eye of a user of the display device;
determining an incident angle of external light with respect to a first region of an image display surface using a first photo sensor;
determining a reflection angle of the eye of the user with respect to the first region using a first camera; and
raising a luminance level at the first region when the incident angle and the reflection angle correspond to each other.

14. The driving method of claim 13, wherein the calibrating includes:
initiating a request that the eye of the user be positioned at a first measurement region of the display device;
measuring a first angle of the eye of the user for the first camera;
initiating a request that the eye of the user be positioned at a second measurement region of the display device while maintaining the height of the eye of the user with respect to the display device;
measuring a second angle of the eye of the user with respect to the first camera; and
determining a height of the eye of the user with respect to the display device based on the first angle, the second angle, and a distance between the first measurement region and the second measurement region.

15. The driving method of claim 14, wherein in the determining the reflection angle of the eye of the user, the determined height of the eye of the user is used.

16. The driving method of claim 13, wherein in determining the incident angle of the external light for the first region,
the incident angle of the external light for the first photo sensor is determined as the incident angle of the external light for the first region.

17. The driving method of claim 13, wherein
in determining the reflection angle of the eye of the user for the first region,
the reflection angle of the eye of the user with respect to the first region is determined by correcting the reflection angle of the eye of the user with respect to the first camera using relative distances of the first region with respect to the first camera.

18. The driving method of claim 13, wherein:
in determining the reflection angle of the eye of the user for the first region,
the reflection angle of the eye of the user with respect to the first region is determined by using the first camera and a second camera spaced apart from the first camera.

19. The driving method of claim 13, wherein in determining the incident angle of the external light for the first region,
a three-dimensional position of an external light source for the display device is determined by using the first photo sensor and second photo sensor spaced apart from the first photo sensor, and the incident angle of the external light for the first region is determined by using the three-dimensional position of the external light source.

\* \* \* \* \*